3,070,256
COATED CONTAINER
John F. Bremmer, Howard J. Wright, and Paul F. Westfall, Kansas City, Mo., assignors to Cook Paint & Varnish Company, Kansas City, Mo., a corporation of Delaware
No Drawing. Filed Apr. 19, 1960, Ser. No. 23,143
9 Claims. (Cl. 220—64)

The present invention relates to novel improvements in coating metallic containers.

The principal object of the invention is to provide metallic containers having unique and highly advantageous interior and/or exterior coatings. Other objects will also be hereinafter apparent.

Broadly stated, the present invention contemplates a can coated with a trimellitic anhydride resin as described in greater detail hereinafter. Essential components of the resin include the trimellitic anhydride, a polyhydric alcohol, typically, propylene glycol, and desirably, a dibasic acid such as adipic acid.

For present purposes, the resinous coating composition may be prepared by cooking the essential components, with or without additional ingredients, and in the absence or presence of organic solvent or other suitable vehicle. No catalyst is necessary although, if desired, an effective amount of a catalyst such as stannous oxalate or aluminum acetate plus sodium acetate may be used. Desirable results may be obtained by cooking at about 300° to 360° F. for 10 to 15 hours, or until an acid number of 60±20 is obtained. Preferred cooking conditions for any specific situation will depend upon a variety of other factors, particularly the resin components, the reaction medium, etc. In any case, the resulting product may then be used as such or with the addition of other components, by coating onto a conventional metal substrate constituting the can interior or exterior. Application of the composition may be accomplished after the can is formed but preferably is carried out prior to can formation. In either case, the coating is completed by curing at elevated temperature, e.g. 375° F. to 2000° F., for from 30 minutes to 1-2 seconds. This results in the formation of a highly satisfactory coating comprising the heat condensation product of trimellitic anhydride, dibasic acid and polyhydric alcohol.

Dibasic acids suitable for use herein include: saturated aliphatic dicarboxylic acids of the formula

$$HOOC(CH_2)_xCOOH$$

wherein $x$ is an integer up to eight or even more (e.g. adipic, succinic, glutaric, pimelic, azelaic and sebacic); aromatic monocyclic and polycyclic dicarboxylic acids, particularly orthophthalic acid, isophthalic acid and terephthalic acid; unsaturated aliphatic dicarboxylic acids, such as fumaric acid and maleic acid; dimerized fatty acids, such as Empol 1022 (which is dimerized linoleic acid, see U.S. Patent 2,861,048), and dimerized rosin such as Hercules "Dymerex."

In lieu of the abovementioned propylene glycol, the polyhydric alcohol may be any short or long chain saturated aliphatic diol, typically, ethylene glycol, trimethylene glycol, the butylene glycols, polyethylene glycols, polypropylene glycols, hexylene glycol, neopentyl glycol, 2-methyl-2-ethyl-1,3-propane diol. Additionally, there may be used higher functionality polyols such as glycerin, trimethylol ethane, trimethylol propane and pentaerythritol. The polyol may be used in substantial excess, e.g. from 15 to 30% excess, on the basis of the combined weight of trimellitic anhydride and diabasic acid, when the functionality of the polyol is two or greater than two. If desired, a mono-basic acid may be added when using a polyol having a functionality greater than 2 to modify the polyol and thereby reduce functionality to around two. Typically suitable monobasic acids include the long chain aliphatic monocarboxylic acids, e.g. acids having at least six carbon atoms in the chain, such as palmitic, lauric, stearic and similar saturated fatty acids; unsaturated acids such as oleic, linoleic and linolenic acids; and mono basic aromatic acids such as benzoic acid, p-tert-butyl benzoic acid and the like.

Water solutions of the trimellitic resins described herein are particularly advantageous for can coating according to the present invention. Such solutions can be prepared with trimellitic resins having relatively high acid numbers, e.g. at least 40 and the addition of an alkaline material or base. Any nitrogen-containing base can be used for this purpose and there may be mentioned as typical the following: ammonium hydroxide, diethylamine, dimethylamine, triethanolamine, ethylenediamine, triethylamine, morpholine, 2-amino-2-methyl-1-propanol and diisopropylamine. These bases, particularly triethylamine, also appear to have the further function of facilitating cure of the resin at somewhat lower temperatures. The amount of base used for the preparation of water solutions will necessarily vary depending upon other conditions but should be sufficient to give the desired water solubility. This usually means adding sufficient base to give a pH of 6 to 9 or, stated another way, from 5 to 15% base on the weight of the resin. The percentage of base may vary outside these limits depending on the acid number and molecular weight of the base used.

In lieu of water solutions, various organic solvent solutions of the resin can be prepared and used for present purposes. Conventional coating solvents may be utilized, for example, aromatic hydrocarbon such as benzene, toluene, and xylene, and/or aliphatic hydrocarbon solvents such as mineral spirits and VMP naphtha. Mixtures of these hydrocarbon solvents and alcohols or other oxygenated solvents, e.g. 40% butanol and 60% xylol are also contemplated. Other aliphatic alcohols can be used instead of butanol e.g. propanol, isopropanol, amyl alcohol, hexanol, etc., in varying precentages. Usually the water solutions will contain from 30 to 40% by weight of resin and the organic solvent solutions will contain from 50 to 70% by weight of resin although other percentages can be used to give desirable coatings. It will be appreciated from the foregoing that these solutions may actually comprise the reaction mixture, as such, including any vehicle used for the resin preparation, or they may be made up by adding the previously prepared resin to the desired solvent with other auxiliary components.

The coating compositions used herein may be applied to the metal substrate in any conventional manner, e.g. by spraying or roller coating. Any of the usual metals from which cans are formed may be coated according to the invention, typically various grades of tin plate, CMQ steel, chemically treated steel, terne plate, aluminum and etched or otherwise chemically treated aluminum.

After the resin composition has been applied thereto, the substrate is baked to complete the coating, preferably at a temperature between 375° F. and 2000° F. for a period ranging from about 10 to 30 minutes at the lower temperature and 1 to 2 seconds at the higher temperature. Optimum baking conditions vary depending upon other operating factors, particularly the nature of the composition utilized.

As noted heretofore, the compositions described herein are useful as the interior and/or exterior coatings of cans or metal containers utilized for food or non-food purposes. Other ingredients may also be incorporated therein for specific functions. For example, when used on tin plate as an interior can coating for food, it may be advantageous to add zinc oxide (e.g. 20 to 40% by weight, based on the resin solids content of the coating composition) to prevent sulfide discoloration of the tin plate. Metallic aluminum (desirably 10 to 20% by weight, based on the resin solids content of the composition) may also be used to hide sulfide discoloration and give other desirable characteristics. Additionally, slick compound may be added to offset sticking of food products to the coating or to make the coating fabricate well in the can making process.

For exterior coatings the wide range of pigments used in paint manufacture may be incorporated to make finishes in a wide range of colors. White coatings have excellent color retention on overbakes and very good chemical resistance.

In a further modification, the resinous coating compositions used herein may be modified by the addition of one or more monohydric alcohols, particularly saturated aliphatic alcohols such as N-butyl alcohol and N-amyl alcohol, as well as their secondary and tertiary counterparts, and 2-ethyl hexyl alcohol to reduce eyeholing and improve wetting. Unsaturated alcohols, typically unsaturated fatty alcohols such as oleyl alcohol, linoleyl alcohol, linolenyl alcohol and mixtures thereof, may also be used for this purpose. It is considered desirable not to use an alcohol which has too low a boiling point, e.g. one below the resin cooking temperature. Accordingly, lower alcohols than butanol should not normally be used. However, any other high boiling alcohol may be effectively used. The amount of such alcohol utilized can be varied, e.g. 15 to 35% by weight of the resin solids.

Other conventional coating ingredients may be used with the trimellitic resins of the present invention. Thus, for example, the resins may be used in admixture with urea-formaldehyde and melamine-formaldehyde coating resins to facilitate cure at low temperatures. Mixtures of this type (for example, 5 to 20% formaldehyde resin and 80 to 95% trimellitic resin by weight) are particularly suitable for exterior coatings. Phenol formaldehyde resins may also be incorporated with the coating resins of the invention. Thus, for example, these mixtures may be used as interior coatings to increase process resistance and to impart amber color to the films. Conventional opacifiers, fillers, etc., may also be included. These materials and/or other components heretofore mentioned, e.g. zinc oxide and/or aluminum, can be dispersed by grinding or otherwise, in conventional vehicles which are compatible with the trimellitic resin and incorporated in the system in this manner.

Further specific modifications of the compositions used herein include the addition of small amounts (e.g. 0.2 to 1.0% by weight of the trimellitic resin) of methocel (methylcellulose) to the aqueous resin solutions. This reduces the tendency to eyeholing and aids in forming a smooth film. Other high molecular weight, water soluble materials, e.g. polyvinyl alcohols, gelatin, casein, ethyl hydroxy ethyl cellulose, carboxymethyl cellulose and hydroxy ethyl cellulose may also be used in lieu of, or in addition to, the methocel.

The proportions of trimellitic anhydride, dibasic acid and polyol can be fairly widely varied in the preparation of the coating resins used herein and depend upon the specific reactants utilized and other factors. In accordance with one preferred embodiment of the invention, the resin may comprise, in mol percentages, from 10 to 30% trimellitic anhydride, 2 to 25% dibasic acid and 50 to 70% glycol or other dihydric alcohol. The amount of dibasic acid can also be lowered in certain cases by the addition of a monoglyceride of a fatty acid, e.g. stearic acid, or some other plasticizing compound. The above mol ratios are not applicable with higher functionality polyols or in the case where a monohydric alcohol and/or monobasic acid are used. Specific mol ratios are difficult to define for such modifications but optimum ratios can be determined in any particular situation depending upon the reactants, nature of the coating desired, etc.

The following examples are illustrative of the invention.

EXAMPLE I

A resin consisting essentially of 45.9 mol percent trimellitic anhydride, 11.6 mol percent adipic acid and 42.5 mol percent propylene glycol, was prepared by cooking the indicated ingredients at a temperature of about 345° F. for 10 hours, i.e., until an acid number of 60±5 was reached. The resulting resin was then reduced in solvent, namely, a mixture of, by weight, 10% butanol, 50% diacetone alcohol and 40% Penola 150 (high boiling aromatic mixture), until a solvent solution of 50% by weight resin was obtained. The resulting resinous solution was then coated on tin plate conventionally used in can manufacture. The coated metal was then baked at about 410° F. oven temperature for about 10–12 minutes. The thus coated metal was then formed into a can with the coating functioning as the interior. The can was found to be highly desirable for food or non-food usage.

EXAMPLE II

Example I was repeated except that the resin was dissolved in water with the aid of 10% triethylamine, based on the weight of resin, to give a 35% solution of the resin in water. Tin plate was coated as in Example I and baked at 380° F. oven temperature for the same time as in Example I to give a highly desirable coating suitable as a can interior or exterior. The somewhat lower curing temperature used in this case appeared to be attributable to the presence of the triethylamine.

EXAMPLE III

Example II was repeated except that the triethylamine was replaced by the equivalent amount of ammonium hydroxide with identical results.

EXAMPLE IV

The following example is illustrative of the use of a monohydric alcohol in preparing the resin compositions described herein and the use of the resulting product for can coating:

A resin consisting essentially of 56.5 mol percent propylene glycol, 8.7 mol percent 2-ethyl hexanol, 8.7 mol percent adipic acid and 26.1 mol percent trimellitic anhydride was prepared by cooking the indicated ingredients at about 330°–345° F. for 10 hours. The resulting resin was dissolved in water using ammonium hydroxide (8% based on the weight of the resin) to give a 35% resin solution. This solution was coated onto tin plate and baked in the manner of Example I to give a highly desirable coating. Improved wetting and reduced eyeholing were obtained with this composition.

EXAMPLE V

Example IV was repeated except that baking was carried out at an oven temperature of about 750° F. for 5 seconds to give an essentially equivalent coating.

EXAMPLE VI

Example IV was repeated except that baking was carried out at an oven temperature of about 2000° F. for approximately 1 second. The results were the same as in Example IV.

EXAMPLE VII

Example IV was repeated except that after cooking and dissolution of the resin, aluminum metal particles amounting to 15% by weight of the solids content, were added. A highly desirable coating with optimum processing characteristics was obtained.

EXAMPLE VIII

The following example is illustrative of the use of a polyol having a functionality greater than two coupled with a monobasic acid in accordance with the present invention:

A resin consisting essentially of 8.3 mol percent glycerine, 50 mol percent propylene glycol, 8.32 mol percent adipic acid, 8.34 mol percent lauric acid and 25.0 mol percent trimellitic anhydride was prepared by cooking the ingredients at about 330°–340° F. for 10 hours. The resulting resin was dissolved in water using ammonium hydroxide (8% based on the weight of resin) to give a 35% solids solution. This solution was coated onto tin plate and baked at an oven temperature of 400° F. for about 10 minutes to give a continuous film having good color and color retention.

EXAMPLE IX

The resin of Example I, reduced with solvent as indicated, was mixed with melamine-formaldehyde resin (specifically, Rohm & Haas MM 55) to give a mixture containing 95% by weight trimellitic resin and 5% formaldehyde resin. The resulting composition was then coated on tin plate, in conventional fashion, and cured at 400° F. for 10 minutes. The thus coated tin plate was conventionally formed into a can with the coating as the exterior surface. The coating demonstrated the following characteristics after pigmentation with $TiO_2$: smooth and continuous, a 45–55 Sward hardness, good flex, excellent solvent and boiling water resistance, pale color and good color retention.

EXAMPLE X

Example IX was repeated except that, in lieu of the formaldehyde resin, 0.4% methocel (based on the weight of resin) was added to the resin solution. This gave a hightly desirable, smooth film free from any eyeholes when applied to tin plate.

EXAMPLE XI

Several further formulations of trimellitic resins suitable for use as interior can coatings are set forth below:

Formulation A

A 33% by weight non-volatiles (resin) solution in water using ammonium hydroxide and having a Gardner viscosity of V–W, the resin therein having an acid number of 63.7 and being obtained in the manner described in Example III by cooking the following:

47.8 mol percent propylene glycol
17.4 mol percent Unadol 90 (unsaturated fatty alcohol of Archer, Daniels Midlands)
8.7 mol percent adipic acid
26.1 mol percent trimellitic anhydride

Formulation B

A 30% non-volatiles solution in water, using $NH_4OH$, and having a Gardner viscosity of $Z_3$–$Z_4$, the resin therein having an acid number of 67 and being obtained in the manner of Example III by cooking the following:

27.3 mol percent trimellitic anhydride
63.6 mol percent neopentyl glycol
9.1 mol percent adipic acid

Formulation C

A 33% non-volatiles solution in water, using $NH_4OH$, and having a Gardner viscosity of A–B, the resin therein having an acid number of 60.5 and being obtained in the manner of Example III by cooking the following:

30.0 mol percent trimellitic anhydride
65.0 mol percent propylene glycol
5.0 mol percent Empol 1022 (Emery-dimerized fatty acids)

Formulation D

A 30% non-volatiles solution in water, using $NH_4OH$, and having a Gardner viscosity of Z–Y, the resin therein having an acid number of 68.5 and being obtained in the manner of Example III by cooking the following:

27.3 mol percent trimellitic anhydride
63.6 mol percent propylene glycol
9.1 mol percent sebacic acid

Formulation E

A 30% non-volatiles solution in water, using $NH_4OH$, and having a Gardner viscosity of Y, the resin therein having an acid number of 62.5 and being obtained in the manner of Example II by cooking the following:

16.7 mol percent trimellitic anhydride
16.7 mol percent adipic acid
8.3 mol percent phthalic anhydride
58.3 mol percent propylene glycol Each of the above formulations when applied to tin plate or other metal as outlined in Example I gives highly satisfactory coatings.

EXAMPLE XII

Each of the formulations of Example XI was modified by reducing the resin in organic solvent, namely, a mixture of 40% butanol and 60% xylol, in lieu of water and $NH_4OH$. These formulations also provide coatings with excellent properties.

Process resistance tests in connection with the foregoing aptly show the unique nature of the resin compositions described herein for can coating. Thus, for example, can interiors have been coated with representative formulations of the present invention and compared with conventional can coatings now in use, namely, oleoresinous, oleoresinous plus ZnO and polybutadiene types. Comparative results wherein the coated can interiors are graded as to resistance to various process media are tabulated below, the formulations of Examples IV and VII being used as representative:

|  | Composition | Process Media | Grade No. |
|---|---|---|---|
| Test I | Oleoresinous | Corn | 3 |
|  | Oleoresinous+ZnO | do | 0 |
|  | Polybutadiene | do | 2 |
|  | Example IV | do | 0 |
|  | Example VII | do | 2 |
| Test II | Oleoresinous | Pumpkin | 0 |
|  | do | do | 0 |
|  | Polybutadiene | do | 2 |
|  | Example IV | do | 0 |
|  | Example VII | do | 0 |
| Test III | Oleoresinous | Pork | 5 |
|  | do | do | 5 |
|  | Polybutadiene | do | 7 |
|  | Example IV | do | 2 |
|  | Example VII | do | 0 |
| Test IV | Oleoresinous | Pork-Soya | 15 |
|  | do | do | 15 |
|  | Polybutadiene | do | 5 |
|  | Example IV | do | 3 |
|  | Example VII | do | 0 |
| Test V | Epon base | Beer | 2 |
|  | Oleoresinous | do | 4 |
|  | Example IV | do | 2 |
| Test VI | Epon base | Citrus | 0 |
|  | Oleoresinous | do | 0 |
|  | Example IV | do | 0 |
| Test VII | Epon base | Tomato | 0 |
|  | Oleoresinous | do | 0 |
|  | Example IV | do | 0 |
| Test VIII | Epon base | Vegetable Juice | 3 |
|  | Oleoresinous | do | 3 |
|  | Example IV | do | 0 |

NOTE.—In the above grading, 0 represents a completely satisfactory coating and any value below 4, preferably 2–3, is commercially acceptable, while any grade beyond 5 is unsatisfactory. The grading was based on a consideration of the following coating characteristics upon exposure to the process media: hardness, fracture, pin blistering, discoloration, spangle, adhesion, and blush. The results show that the coatings of the invention are more uniformly acceptable with a wide range of process media than other coatings in present commercial use.

It will be appreciated that various modifications may be made in the invention described herein. Accordingly, the scope of the invention is defined in the following claims wherein we claim:

1. A metallic container coated with a baked water-insoluble resinous coating comprising the heat condensation product of trimellitic anhydride and a monomeric polyol as the essential reactants.

2. A metallic container coated with a baked resinous coating comprising the heat condensation product of trimellitic anhydride, a dibasic acid and a monomeric polyol as the essential reactants.

3. A metallic container according to claim 2 wherein said polyol is one having a functionality greater than 2.

4. A metallic container according to claim 3 wherein said coating comprises the condensation product of trimellitic anhydride, dibasic acid, a monomeric polyol having a functionality greater than 2 and a monobasic acid.

5. A metallic container according to claim 2 wherein said coating comprises the heat condensation product of trimellitic anhydride, a dibasic acid, a monomeric polyol and a monohydric alcohol.

6. A metallic container according to claim 5 wherein said coating includes metallic aluminum.

7. A metallic container coated with a baked resinous coating comprising the heat condensation product of trimellitic anhydride, a dibasic acid and a monomeric glycol.

8. A metallic container having its interior coated with a water-insoluble resinous coating which is the heat condensation product obtained by baking the reaction product of 10 to 30% trimellitic anhydride, 50 to 70% alkylene glycol and 2 to 25% of a dibasic acid, in weight percentages, said reaction product having an acid number of 60—20.

9. The container of claim 8 wherein said glycol is propylene glycol and said dibasic acid is adipic acid.

References Cited in the file of this patent

UNITED STATES PATENTS

| | | |
|---|---|---|
| 457,849 | Creecy | Aug. 18, 1891 |
| 548,660 | Ruete | Oct. 29, 1895 |
| 1,860,098 | Jaeger | May 24, 1932 |
| 2,184,310 | Meigs et al. | Dec. 26, 1939 |
| 2,270,662 | Raney | Jan. 20, 1942 |
| 2,643,985 | Parker | June 30, 1953 |
| 2,855,884 | Magill | Oct. 14, 1958 |
| 2,888,417 | Crouch | May 26, 1959 |
| 2,892,432 | White | June 30, 1959 |